(12) United States Patent  (10) Patent No.: US 7,475,739 B2
Wuensch  (45) Date of Patent: Jan. 13, 2009

(54) HAND-HELD MACHINE TOOL COMPRISING A DUST BOX

(75) Inventor: Steffen Wuensch, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 10/520,301

(22) PCT Filed: Aug. 7, 2003

(86) PCT No.: PCT/DE03/02668

§ 371 (c)(1),
(2), (4) Date: Jan. 5, 2005

(87) PCT Pub. No.: WO2004/048028

PCT Pub. Date: Jun. 10, 2004

(65) Prior Publication Data

US 2005/0247463 A1  Nov. 10, 2005

(30) Foreign Application Priority Data

Nov. 25, 2002  (DE) .............................. 102 54 839

(51) Int. Cl.
*B23Q 11/00*  (2006.01)
(52) U.S. Cl. ...................... 173/168; 173/179; 173/171; 173/75
(58) Field of Classification Search ................ 173/179, 173/168, 171, 75, 217
See application file for complete search history.

(56) References Cited

U.S. PATENT DOCUMENTS

| 3,368,633 | A | * | 2/1968 | Moates ........................ 173/60 |
| 3,587,752 | A | * | 6/1971 | Smith .......................... 173/179 |
| 4,192,390 | A | * | 3/1980 | Wanner et al. ................. 173/75 |
| 4,209,069 | A | | 6/1980 | Smith |
| 4,361,957 | A | | 12/1982 | Kroetz et al. |
| 5,090,499 | A | * | 2/1992 | Cuneo ......................... 175/209 |
| 5,113,951 | A | * | 5/1992 | Houben et al. ................. 173/75 |
| 5,129,467 | A | * | 7/1992 | Watanabe et al. .............. 173/75 |
| 5,199,501 | A | * | 4/1993 | Kluber et al. .................. 173/75 |
| 5,467,835 | A | * | 11/1995 | Obermeier et al. .......... 175/209 |
| 6,641,634 | B2 | * | 11/2003 | Reich et al. ................. 55/385.1 |
| 6,802,766 | B2 | * | 10/2004 | Liu ............................. 451/451 |
| 2002/0152731 | A1 | | 10/2002 | Reich et al. |
| 2006/0181159 | A1 | * | 8/2006 | Dehde ......................... 310/51 |

* cited by examiner

*Primary Examiner*—Brian D Nash
(74) *Attorney, Agent, or Firm*—Michael J. Striker

(57) ABSTRACT

A power tool (10) with a housing (12) that includes a dust box (50, 150) and a motor (20) with air cooling, and a cooling exhaust-air duct (44, 46) and a chip suctioning duct (40) which guides a chip-suctioning flow can be used with improved performance and in an environmentally friendlier manner due to the fact that the cooling air flows across the dust box (50, 150) under favorable flow conditions, whereby the evacuation of dust into the dust box (50, 150) is improved and whirls of dust caused by cooling air in the tool region are prevented from forming.

10 Claims, 3 Drawing Sheets

HAND-HELD MACHINE TOOL COMPRISING A DUST BOX

CROSS-REFERENCE

The invention described and claimed hereinbelow is also described in PCT/DE 03/02668, filed Aug. 7, 2003 and DE 102 54 839.0, filed Nov. 25, 2002. This German Patent Application, whose subject matter is incorporated here by reference, provides the basis for a claim of priority of invention under 35U.S.C. 119 (a)-(d).

BACKGROUND OF THE INVENTION

The present invention relates to a power tool with dust box.

A power tool with motor air-cooling is made known in U.S. Pat. No. 4,209,069, the cooling air of which is suctioned through the dust box. A dust filter is located between the dust box and the cooling ventilator to prevent dust from entering the interior of the motor with the cooling air. In addition, a chip suctioning tube extends from the power tool to the dust box. The chips and dust produced when a tool engages in a work piece are transported to the dust box through this tube.

The disadvantage of this is that the cooling air flow is restricted by the high resistance of the dust filter located upstream of the cooling ventilator. Dust filters cannot be eliminated, however, since dust entering the motor with the cooling air impairs the motor function. In addition, the cooling exhaust air exiting the motor housing causes unhealthy whirls of dust in the chip-removing region of the tool.

SUMMARY OF THE INVENTION

The present invention has the advantage that the cooling exhaust air can not exit the housing directly and enter the surrounding air. Instead, the cooling exhaust air is directed over the dust box under favorable flow conditions, thereby exiting the housing in an unthrottled manner; the dust evacuation into the dust box is simultaneously improved and the cooling exhaust air is prevented from swirling the dust in the tool region. In addition, chip evacuation in the region of the tool engagement is improved via the injector action of the cooling exhaust-air flow directed over the dust box.

Due to the fact that the cooling exhaust air is guided separately from the dust evacuation air away from the housing to the dust box and past it in an unthrottled manner, the efficiency of the motor cooling is high and uncompromised.

Due to the fact that a suction connecting piece of the housing directs the dust evacuation air separately from the cooling exhaust air, the two air streams are prevented from mixing, ensuring highly efficient dust evacuation and, simultaneously, motor cooling.

Due to the fact that the dust box includes an air outlet opening for both the dust evacuation air and the cooling exhaust air on its back end, the cooling exhaust air must pass over its entire top side and exercise its full effect as a vacuum pump, resulting in a marked improvement in dust evacuation.

Due to the fact that the horizontally longitudinally divided dust evacuation-air branch of the power tool has an inlet opening, located radially outwardly and at the top, to the cooling exhaust-air duct formed in the top part of the dust evacuation-air branch, the cooling exhaust air can be easily guided further to the dust box and across its outer surface.

Improved dust evacuation into the dust box is realizable due to the fact that the dust box includes a coupling branch that fits the dust evacuation-air branch and is capable of being joined therewith, and the cooling exhaust-air duct of the dust box is capable of being coupled with the dust evacuation-air branch, the dimensions of which are matched to those of the cooling exhaust-air duct.

Due to the fact that the dust box is provided with a base capable of being detached in the manner of a cover, it is particularly easy to empty.

Due to the fact that the dust box also includes a top wall capable of being detached in the manner of a cover, it is particularly easy to remove together with the filter, so it can then be tapped to easily remove the dust.

Due to the fact that the cooling exhaust-air flow must exit the housing tangentially through a cyclone-like annular exhaust air duct, flow resistance of the cooling exhaust-air flow is reduced, and noise is dampened. As a result, particularly high vibration frequencies of the cooling exhaust air are suppressed.

BRIEF DESCRIPTION OF THE DRAWINGS

The present invention is explained in greater detail below with reference to an exemplary embodiment with associated drawing.

DETAILED DESCRIPTION OF THE OF EXEMPLARY EMBODIMENT

Figure 1:
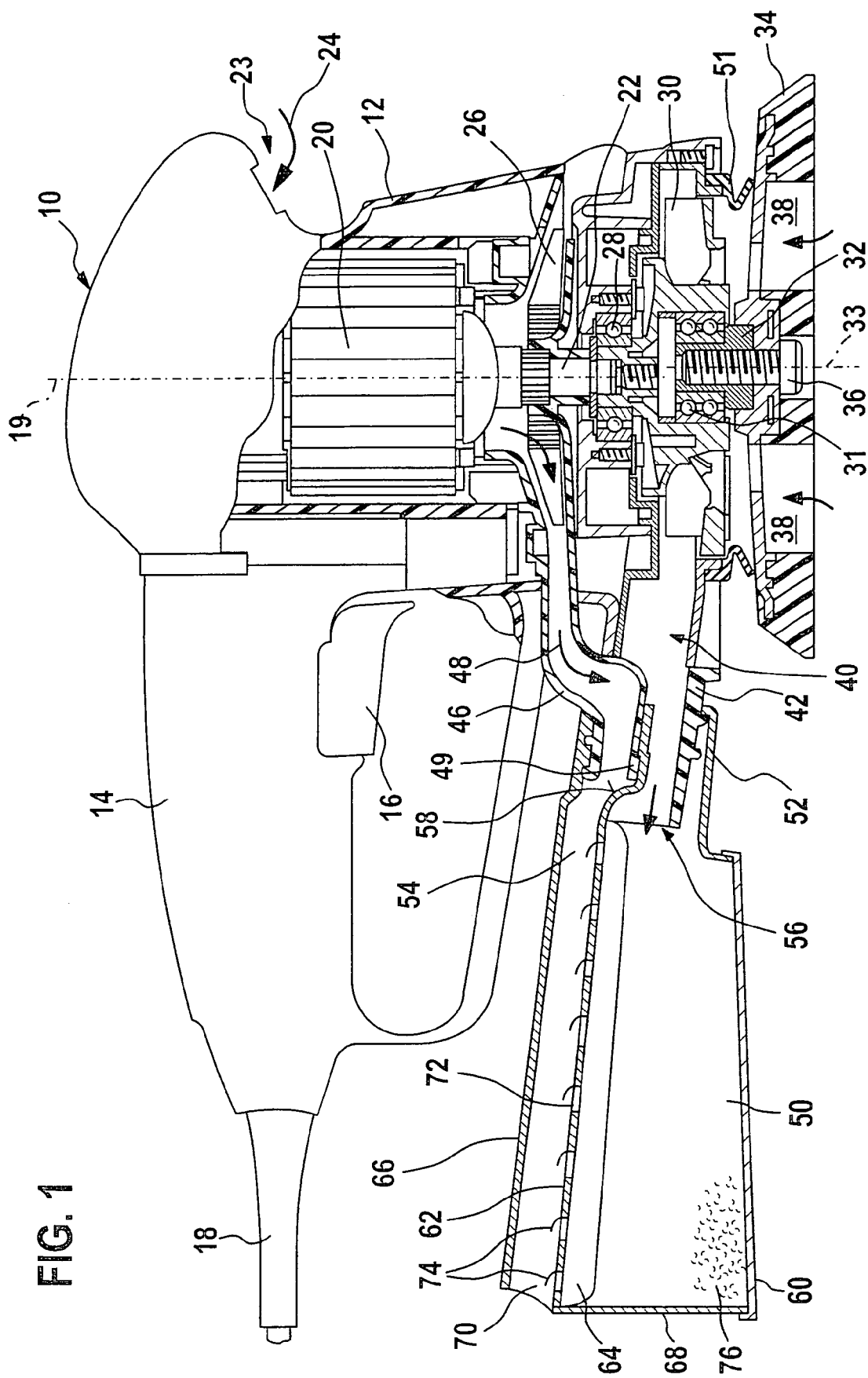
FIG. 1 shows a longitudinal sectional view of a disk-type sander according to the present invention.

The drawing shows a power tool 10 designed as a disk-type sander with a housing 12 that has a horizontal handle 14 shown at the left in the drawing, the handle including a manually-operated switching key 16 of a switch (not shown) for starting and stopping motor 20.

An electric cord 18 extends out of the back end of handle 14, the electric cord providing power to motor 20.

Housing 12 carries motor 20 with a motor axis 19 extending perpendicularly to handle 14, in the downward extension of which a motor shaft 22 projects out of motor 20. Its end is wrapped-around in a torsion-proof manner by a cooling ventilator 26 that moves air radially outwardly in the direction of arrow 48. As a result, cooling outside air is drawn in via the upper region of housing 12 through cooling slits 23 in housing 12; the cooling outside air can flow into housing 12 as indicated by arrow 24 and past motor 20, and then exit housing 12 via its suction connecting piece 42 through a connecting duct 46.

Connecting duct 46 extends to the end of suction connecting piece 42 and is sealed off from it. This is achieved via a separate partition 49 which prevents the cooling exhaust air from mixing with the dust evacuation air in the suction connecting piece. As a result, the cooling exhaust air can exercise its suction effect by flowing across the outer surfaces of dust box 50. When dust box 50 is attached and coupling branch 52 is slid over suction connecting piece 42, an axis-parallel partition 58 of dust box 50 grips underneath partition 49 of suction connecting piece 49. As a result, dust evacuation air can enter dust box 50 via dust evacuation-air duct 40 without swirling and without flow losses and exit the dust box cleaned of dust. To this end, the dust evacuation air passes through a pleated filter 64 located on the top side of dust box 50, in particular tightly bonded with its top cover 42, whereby the exhaust air, cleaned of dust, can pass through a large number of air holes 72 in cover 62 and exit dust box 50 through air outlet opening 70. Air outlet opening 70 is formed between the rear edge of cover 62 and a hood 66 that extends over it. On the side diametrically opposed to the air outlet opening, hood 66 transitions into coupling branch 62 and forms the top side of cooling air duct 54 of dust box 50. Air holes 72 on the top of dust box 50 are partially covered by small spoilers 54, over which the cooling exhaust-air flows rapidly and without swirling, and which helps create a stronger vacuum when cooling exhaust-air flows past air holes 72. As soon as motor 20 of power tool 10 is switched on and cooling exhaust-air flows over cover 62 of dust box 50, a stronger exhaust air flow forms due to air holes 72; this markedly strengthens the dust-evacuation air flow all the way back at dust-suctioning holes 38 in grinding wheel 34, thereby increasing the amount of dust in the air surrounding power tool 10 and increasing the efficiency of grinding work by allowing the abrasive particles to engage more directly in the work piece without being inhibited by grinding dust.

Housing 12, which encloses cooling ventilator 26, is sealed off axially at the bottom and is penetrated by the lower end of motor shaft 22. It is rotatably supported there in a rolling bearing 28.

In the bell-shaped region facing away from cooling ventilator 26, the free end of motor shaft 22 includes a dust ventilator 30 that suctions in air and/or chips through dust-suctioning holes 38 in grinding wheel 34 and blows them out to suction connecting piece 42.

An annular sealing lip 51 seated on the lower edge of housing 12 bears against the top of grinding wheel 34 resiliently and pretensioned in the axial direction. The space between housing 12 and grinding wheel 34 is therefore sealed off from interfering inleak air, and highly-efficient chip evacuation is ensured.

At the bottom, toward grinding wheel 34, dust ventilator 30 includes an eccentric opening (which is not described in greater detail) that functions as a bearing seat for a ball bearing 31. Eccentrically seated ball bearing 31 supports an eccentric pin 32 that is capable of being connected in torsion-proof fashion with grinding wheel 34 via a screw 36.

When motor shaft 22 rotates, eccentric pin 32—and dust ventilator 30—follows this rotation due to its bearing friction and/or that of ball bearing 31 by rotating around its eccentric axis while simultaneously encircling motor axis 19 and/or motor shaft 22. This results in the characteristic orbital oscillating motion of grinding wheel 34, which is typical of disk-type sanders.

Figure 2:
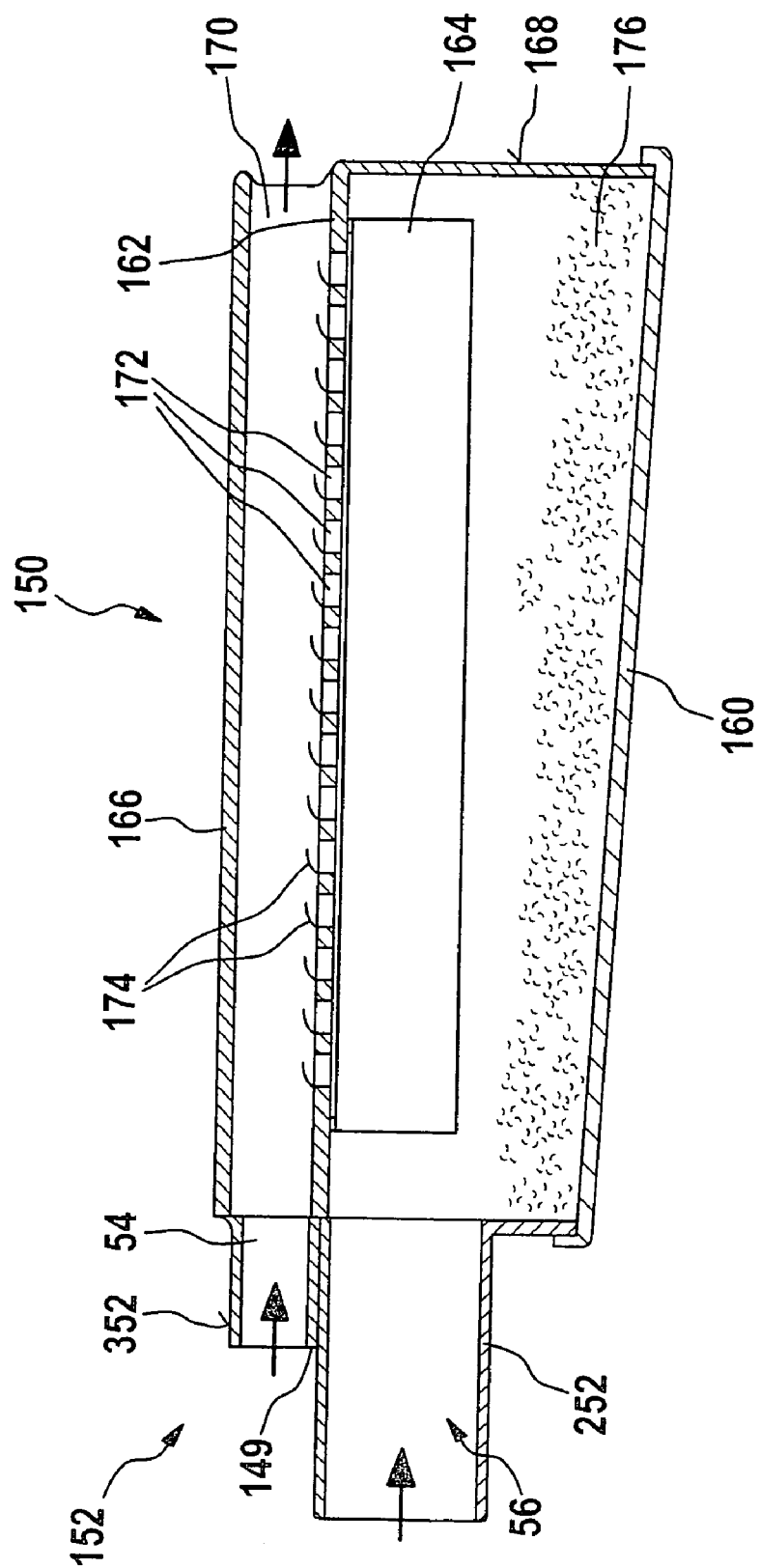
FIG. 2 shows a longitudinal sectional view of a dust box according to the present invention.

FIG. 2 shows a longitudinal sectional view through a further exemplary embodiment of a dust box 150, the cover-like base 160 of which is detachably positioned, thereby enabling convenient removal of dust from dust box 150. Coupling branch 152 is shown on the left side in the drawing; it has a divided configuration and is composed of a top cooling-air duct and a bottom dust air duct, which is formed by a cooling exhaust-air branch 352 and a dust evacuation-air branch 252 extending axially past it. Cover 162 is diametrically opposed to base 160, and it transitions as a single piece into side walls 68 of dust box 150.

On its top side, cover 162 includes a large number of evenly distributed air holes 172 located side-by-side that are provided, on the side facing coupling branch 152, with a large number of gill-like spoilers 174 slanted toward the opposite side, over which cooling exhaust air blown in through cooling air duct 54 flows with minimal flow loss, whereby the vacuum effect at air holes 172 is increased, thereby enabling particularly effective dust evacuation from grinding wheel 34 into dust box 150.

Air holes 172 are covered in a dust-proof manner by pleated paper filter 164 on the inside of dust box 150, so that the dust evacuation air which carries the dust has no other way out of dust box 150 than through pleated filter 164. The dust evacuation air is moved out via a certain overpressure in the interior of dust box 150 and a vacuum which exists above air holes 172.

A slot which extends nearly across the entire width of dust box 150 and functions as air outlet opening 170 is formed on the right side (as shown in the drawing) between the top side of hood 166 and cover 162.

Figure 3:
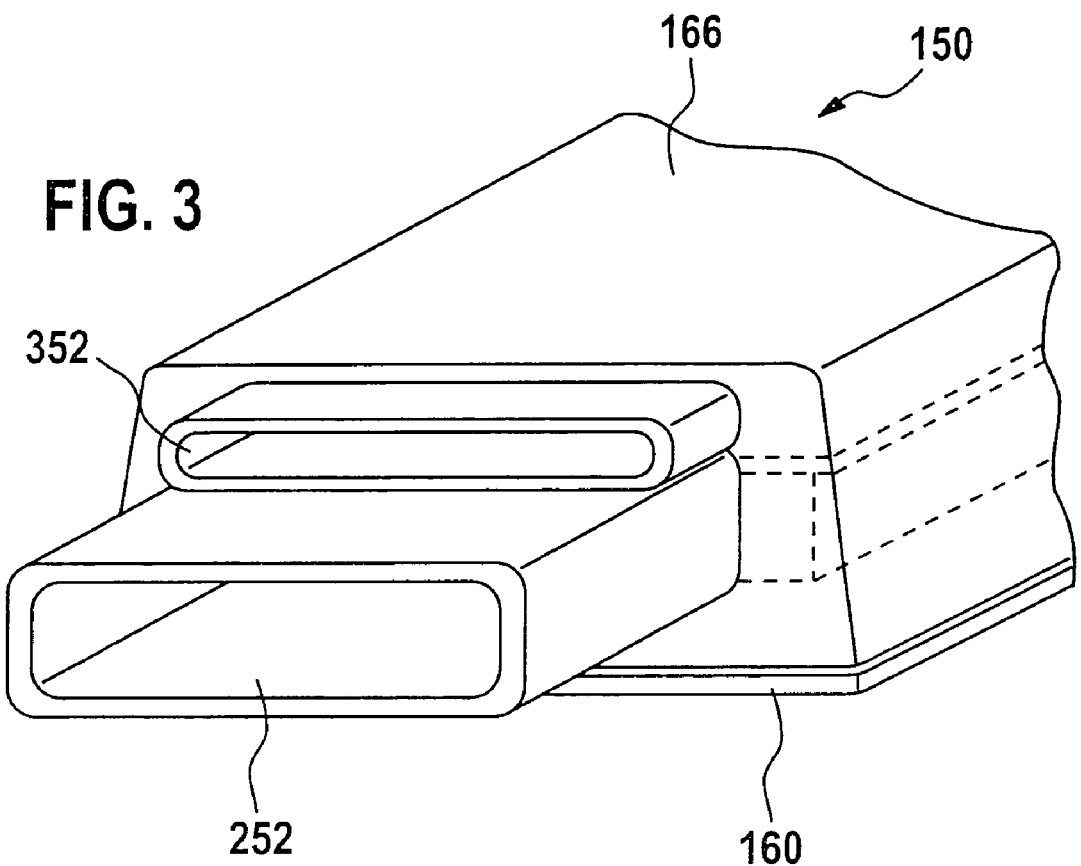
FIG. 3 shows a front view of the dust box according to FIG. 2, and FIGS. 4 and 5 show tubular, longitudinally-divided coupling branches of the dust box.

FIG. 3 shows a front view of dust box 150, whereby the coupling branch formed of cooling exhaust-air duct 352 and dust evacuation-air duct 252 is capable of being coupled with suction branch 42 of power tool 10. Detachable, cover-like base 160 is shown on the underside of dust box 150; after it is opened, dust box 150 can be conveniently cleaned of dust.

Figure 4:
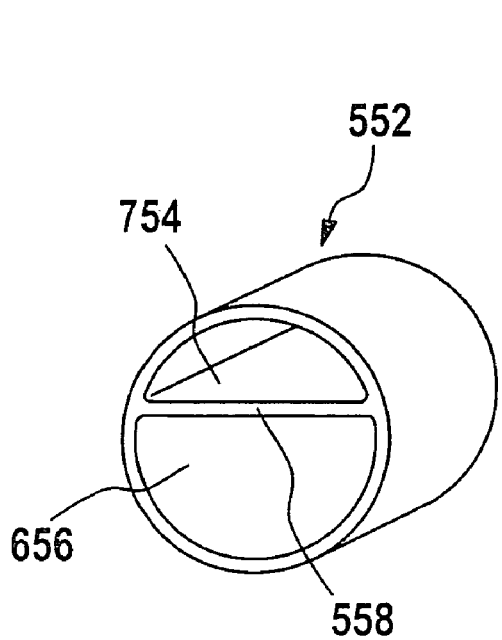
Figure 5:
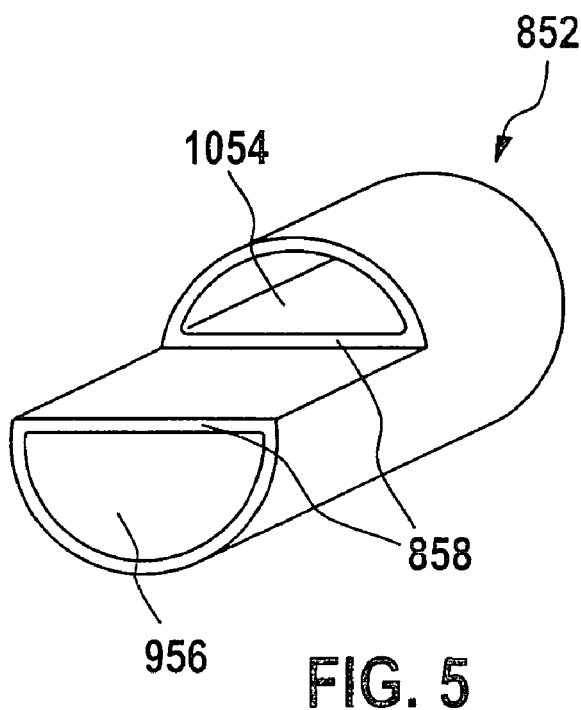

FIGS. 4 and 5 show round-cylindrical coupling branches 552, 852 with longitudinally extending partition 558, 858, via which a separate guidance of the cooling exhaust air and dust evacuation air is ensured in the upper cooling exhaust-air ducts 752 or the dust evacuation-air duct 656 and/or 956 located below it, each of which is separated from the duct above it by a partition 558 or 858.

Corresponding to round-cylindrical coupling branches 552, 862, the configuration of suction branches of housing 12 must also be round-cylindrical in shape with a corresponding longitudinally-oriented partition, so they can be inserted into each other.

What is claimed is:

1. A power tool (10) with a housing (12) that includes a motor (20) with air cooling and a cooling-air exhaust duct (48), and a suction connecting piece (42) that guides cooling exhaust air guided by the cooling-air exhaust duct as well as dust evacuation air, and, connected thereto, a dust box (50, 150) including a top wall with air holes (72, 172) and a base,
    wherein the dust box supports an air-tight hood in parallel with but a distance from the top wall and the base, and
    wherein the dust evacuation air is guided in the suction connecting piece (42) of the housing (12) such that it is sealed off by a partition (49) from the cooling exhaust-air flow.

2. The power tool as recited in claim 1,
    further comprising separated channels for guiding the cooling exhaust air and the dust evacuation air in separate air streams out of the housing (12) to the dust box (50, 150) and further, unthrottled over its air holes (72, 172) over a large surface area as in a flat duct.

3. The power tool as recited in claim 1, wherein the air-tight hood (66) includes an air outlet opening (70) in its back end.

4. The power tool as recited in claim 1, wherein the suction connecting piece (42) has an inlet opening for the cooling-air exhaust duct (48) located radially outwardly and on an upper part of the suction connecting piece (42), that is guided in the upper part of the suction connecting piece (42).

5. The power tool as recited in claim 1,
    wherein the dust box (50, 150) includes a coupling branch (52, 152) for connection with the suction connecting piece (42) of the power tool (10), the cooling air duct (54, 154) of which is capable of being coupled with the cooling exhaust-air guided by the suction connecting piece (42).

6. The power tool as recited in claim 1, wherein the base of the dust box (50, 150) is capable of being detached in the manner of a cover.

7. The power tool as recited in claim 1, wherein the top wall (62) of the dust box is capable of being detached in the manner of a cover, the top wall carrying a pleated filter (64).

8. The power tool as recited in claim 1, wherein the cooling exhaust-air duct (46) is enlarged in the manner of a funnel in the outflow direction and, at its largest cross section, leads into the suction connecting piece.

9. The power tool as recited in claim 1, wherein cooling exhaust air flows in the space between the top wall of the dust box and the air-tight hood.

10. The power tool as recited in claim 1, wherein dust evacuation air flows in the space between the top wall of the dust box and the base of the dust box before it passes through the air holes in the top wall of the dust box to enter the space between the top wall of the dust box and the air-tight hood.

* * * * *